(12) United States Patent
Gullapalli et al.

(10) Patent No.: US 6,984,049 B2
(45) Date of Patent: Jan. 10, 2006

(54) HINGED SUBSTRATE FOR LARGE-APERTURE, LIGHTWEIGHT, DEFORMABLE MIRRORS

(75) Inventors: Sarma Gullapalli, Centreville, VA (US); Carl Crane, Gainesville, FL (US); Neil White, Gainesville, FL (US); Harvey Lipkin, Decatur, GA (US); Joseph Duffy, deceased, late of Gainesville, FL (US); by Anne Duffy, legal representative, Gainesville, FL (US)

(73) Assignee: General Dynamics Advanced Information Systems, Inc., Arlington, VA (US)

( * ) Notice: Subject to any disclaimer, the term of this patent is extended or adjusted under 35 U.S.C. 154(b) by 0 days.

(21) Appl. No.: 10/287,725

(22) Filed: Nov. 4, 2002

(65) Prior Publication Data

US 2004/0085657 A1 May 6, 2004

(51) Int. Cl.
*G02B 5/08* (2006.01)
*G02B 7/182* (2006.01)

(52) U.S. Cl. ............... 359/849; 359/869; 343/912
(58) Field of Classification Search ............... 359/846, 359/848, 849, 855, 869; 343/834, 840, 912
See application file for complete search history.

(56) References Cited

U.S. PATENT DOCUMENTS

| | | | |
|---|---|---|---|
| 4,066,343 A * | 1/1978 | Scott | 359/849 |
| 4,655,022 A * | 4/1987 | Natori | 52/646 |
| 5,473,852 A * | 12/1995 | Lindsey | 52/648.1 |
| 6,108,121 A | 8/2000 | Mansell et al. | 359/291 |
| 6,128,121 A | 10/2000 | Choi et al. | 359/224 |
| 6,137,622 A | 10/2000 | La Fiandra | 359/290 |
| 6,181,459 B1 | 1/2001 | La Fiandra | 359/290 |
| 6,195,067 B1 * | 2/2001 | Gilger | 343/915 |
| 6,236,490 B1 | 5/2001 | Shen | 359/247 |
| 6,243,057 B1 | 6/2001 | Blaxtan et al. | 345/84 |
| 6,293,680 B1 | 9/2001 | Bruns | 359/849 |
| 6,384,952 B1 | 5/2002 | Clark et al. | 359/224 |
| 6,398,372 B1 | 6/2002 | Okada | 359/846 |
| 6,402,329 B1 | 6/2002 | Bailly et al. | 359/872 |
| 6,424,076 B1 | 7/2002 | Gullapalli | 310/328 |
| 6,441,801 B1 * | 8/2002 | Knight et al. | 343/915 |
| 6,765,712 B2 * | 7/2004 | Van Dijsseldonk et al. | 359/291 |

\* cited by examiner

*Primary Examiner*—Mark. A. Robinson
(74) *Attorney, Agent, or Firm*—Gifford, Krass, Groh, Sprinkle, Anderson & Citkowski, PC (57) ABSTRACT

An improved structure and method for building large-aperture lightweight deformable mirrors uses a hinged substrate. In addition to reduced weight, the approach provides rigidity to the mirror, which is necessary for the accurate response to actuator commands and tolerance to disturbances. No stresses are induced in the substrate due to the commanded deformation of the substrate, regardless of the magnitude of the deformation. Any stresses in the substrate structure are those induced due to forces in the face sheet, which are likely to be small using advanced nano-laminate and membrane face sheet technologies. The magnitude of the deformation (dynamic range) is limited only by the actuator stroke, and not by the stresses induced in the substrate. The design therefore accommodates small-force, large-stroke actuators, as opposed to the current designs that use large-force, small-stroke actuators. The invention finds utility in numerous applications, including lightweight large aperture mirror substrate and RF reflector structures.

26 Claims, 8 Drawing Sheets

F Front side points
B Backside points
Green: Front side beams
Blue: Back side beams
Red: Cross beams

HINGED SUBSTRATE FOR LARGE-APERTURE, LIGHTWEIGHT, DEFORMABLE MIRRORS

FIELD OF THE INVENTION

This invention relates generally to deformable mirrors and, in particular, to a hinged, as opposed to a monolithic, substrate for deformable mirrors.

BACKGROUND OF THE INVENTION

Existing deformable mirror technologies make use of a monolithic substrate to support the mirror face sheet, which is either bonded to the substrate or is an integral part of the substrate itself.

Figure 1A:
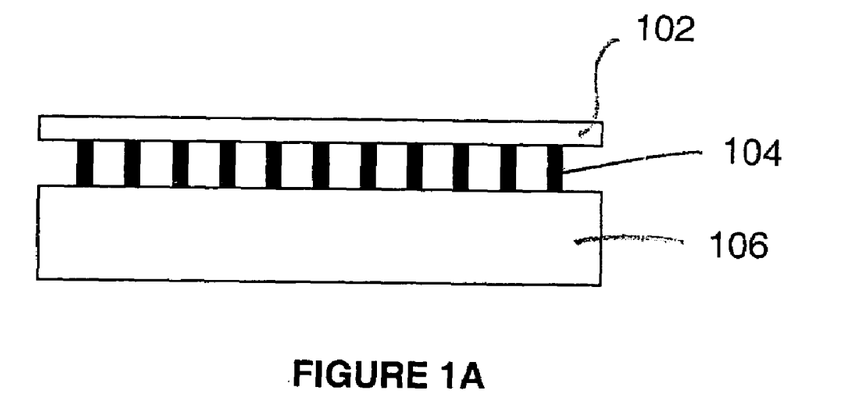
FIG. 1A shows a prior art surface normal actuator (SNA) design.
Figure 1B:
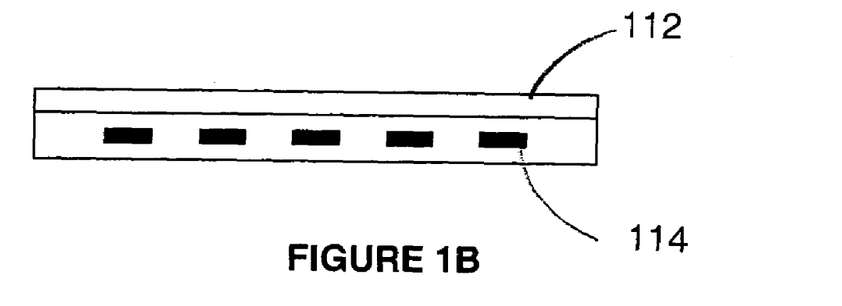
FIG. 1B shows a prior art surface parallel actuator (SPA) design.

FIG. 1A shows a prior-art surface normal actuator (SNA) design, and FIG. 1B shows a prior-art surface parallel actuator (SPA) design. In FIG. 1A, the deformation of the mirror face sheet 102 is achieved using actuators 104 which react against a rigid back plane 106. In FIG. 1B, the actuators 114 are parallel to the mirror face sheet 112. The actuators 114 deform the substrate structure itself, but do not require a rigid back plane.

The SNA design requires a stiff monolithic back plane, which limits the extent to which the substrate can be light weighted, especially for large aperture mirrors. The SPA design, on the other hand, requires the deformation of the monolithic substrate itself, resulting in high stress levels and stress concentrations in the substrate, which limit the extent to which the substrate can made lightweight. Typically, the SNA design is heavier than the SPA design, but it can provide optical correctability to higher spatial frequencies; as such, more actuators can be used per unit surface area of the mirror.

The stresses induced in the mirror face sheet itself, due to bending and hoop stresses, also influence the design and the achievable weight. Past and current deformable mirror technologies have typically used glass face sheets, which cannot be thinned below about 1 mm. New mirror face sheet technologies such as the nano-laminate and membrane approaches are producing extremely thin face sheets, typically less than about 0.05 mm, which are extremely light (small fractions of kg per square meter), and which also have extremely low bending stiffness.

There is also a hybrid deformable mirror technology under development that combines the nano-laminate technology with the monolithic substrate SPA technology. This combination is expected to push mirror weight down to values smaller than the current glass technologies, but much heavier than the nano-laminate itself. If it becomes necessary to push the light weighting down further, a further evolution of substrate and actuation technologies would be required to enable extremely large aperture designs, for a given mirror weight.

There are research efforts aimed at eliminating the distributed support (substrate) structure altogether and deform the mirror face sheet with some distributed actuation scheme such as distributed "patch" actuators or electrostatic actuation using some charge deposition scheme using electron gun. However, all such schemes suffer from a fundamental difficulty due to the lack of rigidity of the mirror. In addition to being able to deform the mirror, it is necessary to provide some rigidity to the mirror, not only to withstand disturbances but also to ensure that the response to a given set of actuator commands is unique.

A major design constraint in the prior art mirror designs is the effect of the Coefficient of Thermal Expansion (CTE) mismatch between the face sheet and its supporting substrate, which drives the design to (a) minimize CTE mismatch, or reduce CTE to almost zero, and (b) impose temperature control with tight tolerances.

SUMMARY OF THE INVENTION

This invention resides in an improved structure and method for building large-aperture lightweight deformable mirrors using a hinged as opposed to monolithic substrate. In addition to reduced weight, the approach provides rigidity to the mirror, which is necessary for the accurate response to actuator commands and tolerance to disturbances. A major claim of this invention is that the actuated hinged substrate allows tolerance of large CTE mismatch between the face sheet and the substrate, under severe temperature conditions. This invention accomplishes this CTE mismatch tolerance by being able to deform the substrate in the tangential (in-plane) directions of the face sheet, in addition to the direction normal to the face sheet. By adjusting the tangential locations of the substrate's support points of the face sheet by actuation, the effects of CTE mismatch are eliminated. This capability is unique to this invention.

No stresses are induced in the substrate due to the commanded deformation of the substrate, regardless of the magnitude of the deformation. Any stresses in the substrate structure are those induced due to forces in the face sheet, which are likely to be small using advanced nano-laminate and membrane face sheet technologies.

The magnitude of the deformation (dynamic range) is limited only by the actuator stroke, and not by the stresses induced in the substrate. The design therefore accommodates small-force, large-stroke actuators, as opposed to the current designs that use large-force, small-stroke actuators.

The invention finds utility in numerous applications, including lightweight large aperture mirror substrate and RF reflector structures.

DETAILED DESCRIPTION OF THE INVENTION

This invention improves upon the existing art by providing a sufficiently rigid yet deformable mirror substrate with extremely low (near zero) substrate stress levels, limited only by the stresses resulting from the face sheet characteristics, which can be made very low using the newly emerging nano-laminate and membrane technologies.

The hinges used in the description of this invention are flexure hinges or pivots, explained as follows. The flexure hinge or pivot consists of the flexures coming together at any given joint being welded or bonded together, so that the angles between the tangents to the flexures at a given joint remain constant. For small motions, when the flexures undergo small deflections, it can be shown from geometrical considerations that we can approximate the flexure hinge or pivot joint with an ideal hinge, with the beams along the straight lines joining the pivot points in the substrate. Such flexure hinges or pivots have been in widely used in optical mounts for a long time, to approximate ideal hinges, and the ideal hinge approximation is a well-understood one. The advantage of using flexure hinges is that it avoids the disadvantages of using real hinges that use sliding contacts (such as spherical ball and socket joints or universal joints), namely the micro creep and micro lurch problems, and the need to provide preloads. The following development of the theory of the hinged substrate assumes ideal hinges. In practice, the flexures do bend a little, and so there is some small moment transmitted across the joint, but that is negligible. Also, if necessary, the actuators in the substrate can be commanded in such a manner as to control the bending moments in the flexures at the support points of the face sheet, thereby applying either zero bending moments or some small desired bending moments, into the face sheet. This is because, in the design, there are sufficiently more actuators (control degrees of freedom) in the substrate than those needed to effect tangential and normal deformations at the face sheet support points. Thus, even the small bending moments in the flexures supporting the face sheet can be zeroed, if needed.

Figure 2:
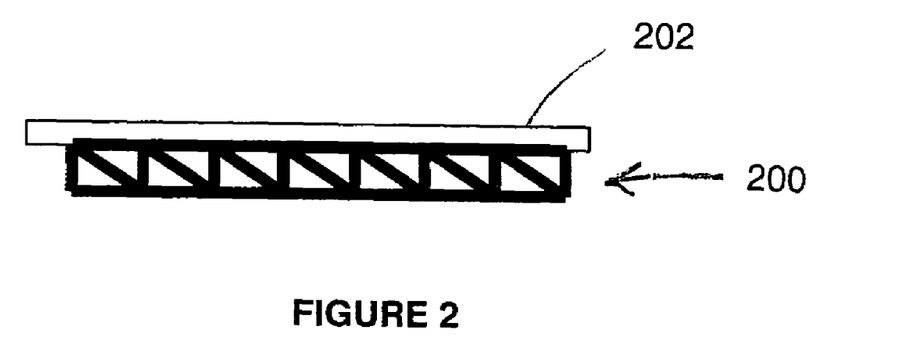
FIG. 2 shows a hinged substrate deformable mirror of the present invention.

A hinged structural substrate design according to the invention is shown generally at 200 in the simplified diagram of FIG. 2. In the preferred embodiment, the hinges have zero dead-zone using appropriate techniques such as flexure pivots. If the mirror face sheet 202 requires zero (arbitrarily small) forces or torques to deform it, then the hinged substrate will also require zero (arbitrarily small) forces and stresses. The extremely low substrate force levels mean that the actuators need not develop large forces. This may drive the actuator design to technologies other than those currently used, namely piezo- or electrostrictive or magnetostrictive devices, which develop large forces but have a very small stroke and are heavy.

Broadly, the hinged structure is made up of a set of beams (links) that are joined at certain points to form a structure. In the preferred embodiment, all the joints are ideal in the sense that the torque transmitted across any hinge is identically zero. A hinged structure is said to be rigid if there can be no relative motion between any two of its points while maintaining zero stress in the beams. When stress in the beams is zero, the only motion possible for a rigid hinged structure is the rigid body motion of the entire structure as a whole.

The property of rigidity is important for the hinged structure to function as a mirror substrate, since otherwise the mirror shape is not unique for given beam lengths, and so the deformation resulting from a given command (beam length change) may be quite different from what is expected.

A hinged structure is said to be a minimally rigid hinged structure, if (a) it is rigid, and (b) the removal of any one beam makes the structure non-rigid, that is, permits relative motion between some points of the structure.

In a minimally rigid hinged structure, there are no over-constraints, and so there are no stresses in the beams of the structure even if the lengths of the beams are changed arbitrarily, as long as there are no external forces acting on the structure. If there are over-constraints, on the other hand, as the lengths of the beams are changed arbitrarily, in general, there will be stresses in the beams even when there are no external forces acting on the structure. When over-constraints are present, in order to make the stresses zero, the changes in the beam lengths must be according to a precise relationship among them, and not arbitrary.

If the length of a beam of a minimally rigid hinged structure is changed, then the shape of the structure changes but there are no stresses induced in the structure. That is, the structure is deformed with zero stresses in its constituent beams. This property of zero stress is attractive in the design of lightweight deformable optical mirrors and RF reflectors. It will seen, however, that in the case of optical mirrors (and in the case of RF reflectors which use a continuous face sheet for reflecting surface), this ideal of zero stress in the substrate structure can be approached but not reached, due to some stresses that are inevitable in deforming the thin face sheet. Still, it is very attractive to be able to reduce the stresses to the bare minimum, and to work this bare minimum stress levels down through improvements in the face sheet technology.

Let n=the number of points in the structure. In the absence of any beams, the n points have 3n degrees of freedom (DOFs). Let m=the number of beams. The beam connecting two points at $\{x_i, y_i, z_i\}$ and $\{x_j, y_j, z_j\}$ introduces a constraint:

$$(x_i-x_j)^2+(y_i-y_j)^2+(z_i-z_j)^2=(L_{i,j})^2 \tag{1}$$

where $L_{i,j}$ is the length of the beam between points i and j. The m beams therefore introduce m constraints. If 3n−m>6, it means that there are more degrees of freedom than the six rigid body degrees of freedom, and so the structure will not be rigid. If 3n−m<6, there are over constraints. Therefore, a necessary (but not sufficient) condition for the hinged structure to be minimally rigid is:

$$m=3n-6 \tag{2}$$

If the m constraints are independent, then this condition is also sufficient. For small displacements of points, the constraint equation becomes:

$$(x_i-x_j)(dx_i-dx_j)+(y_i-y_j)(dy_i-dy_j)+(z_i-z_j)(dz_i-dz_j)=L_{i,j}dL_{i,j} \tag{3}$$

A 3n element column vector made up of the small displacements of the n points can be defined as:

$$dxyz = \{dx_i, dy_i, dz_i, i=1\ldots n\}^T, \text{ T for transpose.} \quad (4)$$

Equation (3) can be written in matrix form as:

$$H1\ dxyz = \{dL_k, k=1\ldots m\}^T \text{ where } dL_k = dL_{i,j} \text{ and } H1 \text{ is a } (m \times 3n) \text{ matrix} \quad (5)$$

The small displacements of the six rigid body degrees of freedom, $\{dx0, dy0, dz0, d\theta x0, d\theta y0, d\theta z0\}$, are related to the corresponding small displacements of the points by the following relationships, $dx_i = dx0 + z_i d\theta y0 - y_i d\theta z0$, $i=1\ldots n$, $dy_i = dy0 + x_i d\theta z0 - z_i d\theta x0$, $i=1\ldots n$, $dz_i = dz0 + y_i d\theta x0 - x_i d\theta y0$, $i=1\ldots n$, which can be written in matrix form as: $dxyz = R\{dx0, dy0, dz0, d\theta x0, d\theta y0, d\theta z0\}^T$, where R is a $(3n \times 6)$ matrix, from which we get:

$$\{dx0, dy0, dz0, d\theta x0, d\theta y0, d\theta z0\}^T = (R^T R)^{-1} R^T dxyz = H2\ dxyz \quad (6)$$

which, for an arbitrary displacement vector dxyz, defines the least squares best fit rigid body motion of the entire structure. The rank of matrix H2 is 6, because $\{dx0, dy0, dz0, d\theta x0, d\theta y0, d\theta z0\}$ are six independent variables. Equations (5) and (6) can be combined as:

$$H\ dxyz = cmd, \quad (7)$$

Where H is the $((m+6) \times 3n)$ matrix whose first m rows are the rows of matrix H1, and the last six rows are the rows of matrix H2, and cmd is the (m+6) column (command) vector whose first m elements are the m changes in the beam lengths $\{dL_k, k=1\ldots m\}^T$ and the last six elements are the six rigid body motions $\{dx0, dy0, dz0, d\theta x0, d\theta y0, d\theta z0\}^T$. When the necessary condition for minimal rigidity, m=3n−6 (equation (2)), is satisfied, the matrix H has dimensions $(3n \times 3n)$.

The condition that the m constraints (equation (3)) be independent is equivalent to the condition that the rank of matrix H1 must equal m, which in turn must equal (3n−6). Therefore, the necessary and sufficient condition for the given hinged structure to be minimally rigid is that the matrix H1 must have size (3n−6)×3n and rank equal to (3n−6).

In the 3n dimensional space spanned by the vector dxyz, all the points in the 6 dimensional subspace spanned by H2 dxyz correspond to rigid body motions of the entire structure, that is, with zero relative motion between the n points, with zero changes in the beam lengths. Thus, the subspace spanned by H2 dxyz is orthogonal to the remaining (3n−6) dimensional subspace. Therefore, for a minimally rigid structure, since the rank of H1 is (3n−6), and the rank of H2 is 6, it follows that the rank of matrix H is 3n. Therefore, another necessary and sufficient condition for the given hinged structure to be minimally rigid is that the rank of matrix H must equal 3n. When the hinged structure satisfies this condition (rank H=3n), H can be inverted to get:

$$dxyz = G\ cmd \text{ where } G = H^{-1} \quad (8)$$

Equations (7) and (8) define the relationship between beam length changes and the motion of the points of the minimally rigid hinged mirror substrate, including rigid body motions. The six rigid body motions require six external actuators, such as a set of three bipods attached to a fixed reference platform.

Because the vector dxyz spans all possible combinations of the small motions of all the points, it follows that the minimally rigid hinged structure can be commanded to make its front surface conform to any desired deformed shape, subject only to the spatial sampling by the points on the front surface. Interestingly, the points on the mirror surface can be commanded to move in directions that are tangential as well as normal to the mirror surface, and so can accommodate not only wave front corrections, but also CTE (coefficient of thermal expansion) mismatch between mirror face sheet and the substrate.

Figure 3:
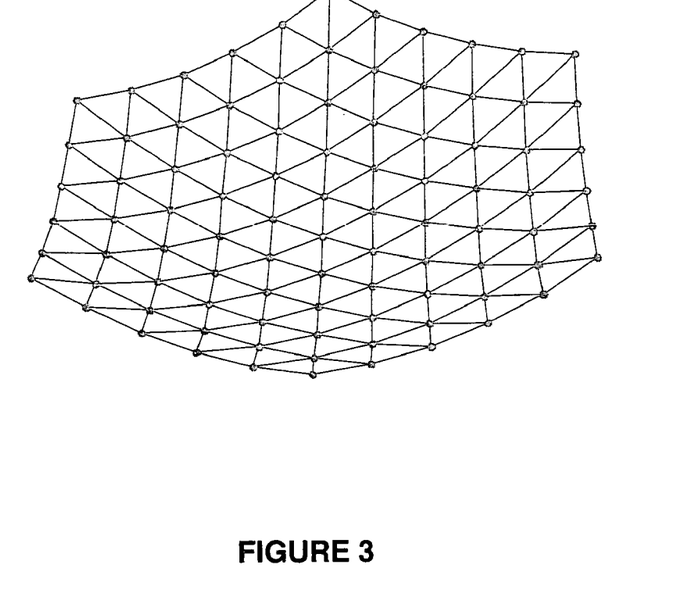
FIG. 3 shows a non-rigid hinged structure.

The face sheet should have adequate stiffness to maintain its local smoothness between the adjacent support (substrate pivot) points. The points of the hinged structure shown in FIG. 3 are on a paraboloidal surface. For this structure, the number of points (n) is 91, and the number of beams (m) is 240, and so (3n−6)=267 is greater than m and so this structure is not rigid. This means that for any given set of values of the lengths of the m beams, some points can move relative to each other, which means that the shape of the structure is not unique.

This flexibility of the structure for given lengths of the beams means that the mirror shape cannot be held in any given configuration by merely adjusting the beam lengths. Therefore this is not an acceptable structure for the mirror. Even though the surface is a curved surface, it lacks rigidity.

If one were to define such structures using quadrilaterals or pentagons or hexagons as the basic geometrical elements instead of the triangles, the difference (3n−m) will be even greater than that for the above triangular cases, which makes the problem of non-rigidity even worse. This lack of rigidity is the reason that such single layer unsupported structures will not work for the purpose of controlling the mirror surface shape. It therefore appears that support from behind the mirror, a substrate of some sort, will be required, to provide rigidity to the whole mirror assembly.

It is interesting to note that as the size of the elemental triangle in this structure is made small, keeping the aperture size the same, that is, as the aperture is more densely populated by the triangles, then this structure may approximate, in some sense, a continuous thin face sheet such as a membrane which has negligible bending stiffness. Some proposed membrane mirror structures use a rigid ring supporting the boundary of the mirror at the periphery. This kind of rigidization at the boundary may help, but will severely restrict the range of shapes to which the mirror can be deformed.

If such restrictions on deformable shapes due to such rigidization are acceptable, such as by using only a smaller diameter aperture within the ring and obscuring the rest, then the above theory can help properly define the boundary conditions. For example, if p of the points (p>2) are made permanently rigid with respect to each other (such as at the periphery), this would replace 3p degrees of freedom of these p points with 6, since these p points must always move as a rigid body. If there are q beams whose both end points are among these p points, then the number of beam constraints is reduced by q. This changes the necessary condition for minimal rigidity from 3n−6=m to (3n−3p)=(m−q). Still, the necessary and sufficient condition must be satisfied, that the rank of the new H1 matrix with (m−q) rows and (3n−3p) columns equal (m−q). For the membrane design with a rigid boundary ring, this condition must be satisfied as the size of the basic triangle is made arbitrarily small. The fixed boundary condition, however, severely restricts the shapes achievable.

Even small hinged structures of this type lack rigidity, as shown below:

n = 5, m = 8    n = 6, m = 10    n = 7, m = 12, (3n - 6) > m

Thus, the only hinged structures that have rigidity and are based on this single layer topology, which has a topological mapping on to a plane in which the beams do not intersect, appear to be the planar triangle and the triangular pyramid:

n = 3, m = 3    n = 4, m = 6, (3n - 6) = m

The topology of such hinged structures has the property that they all have a topological mapping of the structure onto a plane such that in that plane none of the beams intersect each other, similar to the planar circuit topology familiar to the electrical engineers.

Figure 4A:
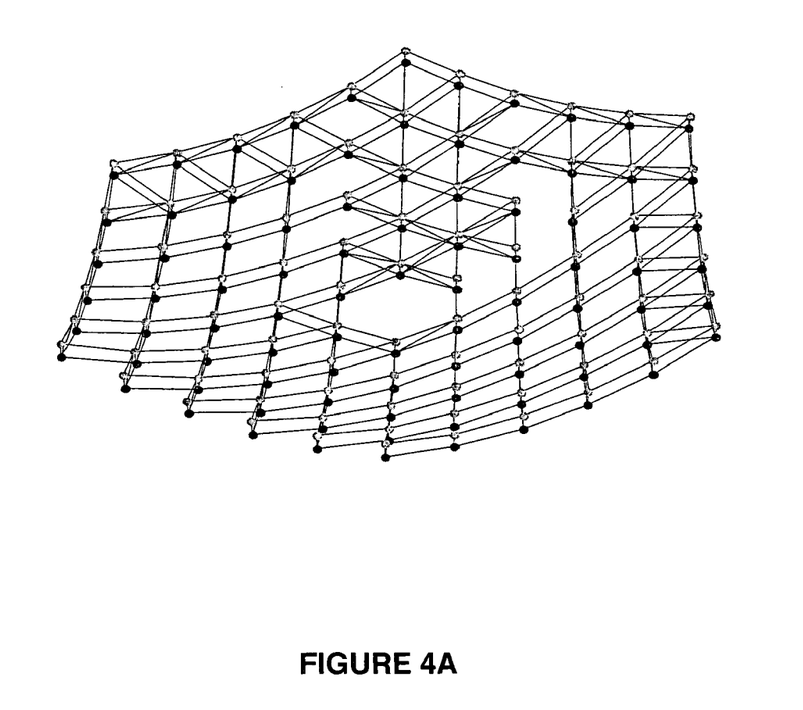
FIG. 4A shows a minimally rigid hinged structure.

The hinged structure shown in FIG. 4A has 90 points on the front surface and 90 on the back surface, for a total of 180 points, that is, n=180. The front surface points are on a paraboloid, except that this example has a central obscuration hole in the middle. The central obscuration is included in this example only to show that it presents no problem. There are 534 beams, that is m=534, which satisfy the necessary condition for rigidity, namely (3n−6)=m. The H matrix for this structure has a rank of 540, verifying that it is a minimally rigid structure.

Figure 4B:
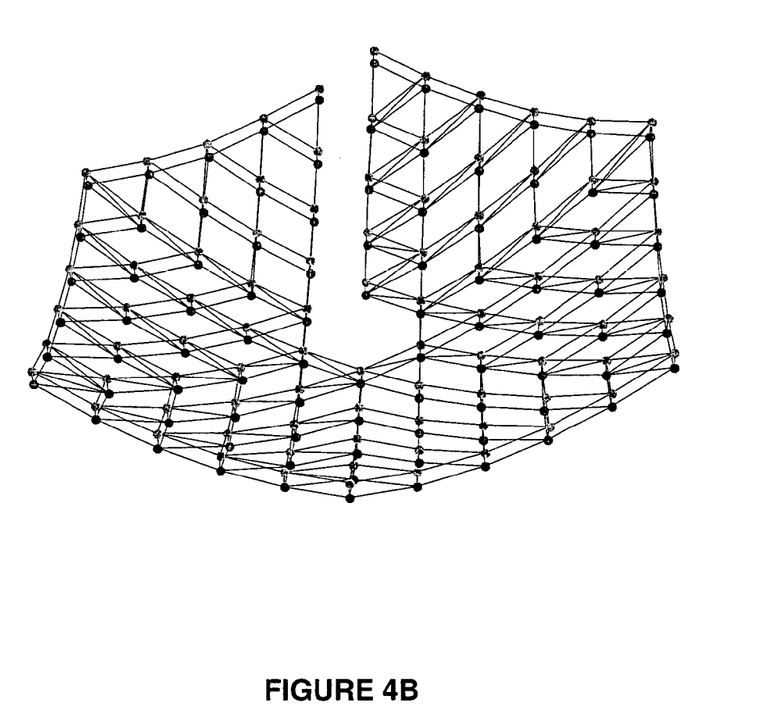
FIG. 4B shows an alternative minimally rigid hinged structure.

The hinged structure shown in FIG. 4B also has 90 points on the front surface and 90 on the back surface, for a total of 180 points, that is, n=180, exactly the same as in the example above. There are 534 beams, that is m=534, which satisfy the necessary condition for rigidity, namely (3n−6)=m. The H matrix for this structure has a rank of 540, verifying that it is a minimally rigid structure. The only difference between this and the one shown in FIG. 4A is that the sequence used in the method of construction is different. This example illustrates how the topology of a hinged minimally rigid structure may have gaps that may affect other properties of the structure such as the natural frequencies. In spite of such a large gap, this structure is rigid. This example also serves to illustrate that for a given set of points, the minimally rigid hinged structure is not unique.

In either of the two examples shown in FIGS. 4A and 4B, if we were to bridge the gaps that are there with additional beams, then the structure would become over constrained. If we have perfect knowledge of the geometry of the system, then we can change the lengths of all beams, including the lengths of the additional (gap bridging) beams, such that the resulting deformed structure still has zero stresses. Thus, any stresses developed will be due to the imperfect knowledge of the geometry of the structure, and of the actuation (changes imparted to the beams), and can be kept at low levels by requiring good knowledge of the geometry of the structure.

We will now develop a step-by-step method to construct a minimally rigid mirror substrate structure given a set of points. It is important to choose the set of points such that it permits a clear front surface that can support the mirror face sheet. For example, if a single layer of points representing just the front surface is chosen as in the example of the non-rigid hinged structure shown in FIG. 3, then, to rigidize it, cross beams may be required that would be in front of the mirror surface. Therefore, it is necessary to define an appropriate set of points behind the front surface as well, so that support from behind the mirror to rigidize the structure becomes feasible. In the absence of the knowledge of how to place the points behind the front surface in general, one specific intuitive method is to define a set of points for the back surface that is a replica of the front surface. This method is used in constructing the examples shown in FIGS. 4A and 4B.

This method is very general and is applicable to any minimally rigid hinged structure, but we will use for our examples the structures whose geometry is particularly well-suited for use as mirror substrates. We will start with a primitive small minimally rigid hinged structure, and then go on adding to it points and beams until all the given points are covered. The development of this approach given here is mostly by inspection, but it is equivalent to mathematically verifying that the rank of matrix H1 at each step meets the criterion for the minimally rigid hinged structure, as we add more points and beams.

Figure 5A:
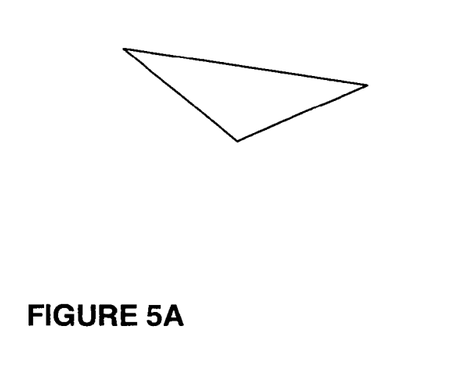
FIG. 5A shows a compact, minimally rigid hinged structure.

Consider the smallest minimally rigid hinged structure that has a non-zero area, the hinged triangle shown in FIG. 5A. This is a rigid structure, because any motion of a point, keeping the lengths of the three sides fixed, will be a rigid body motion of the triangle as a whole, with no relative motion between the three points.

This has three points and so has 3×3=9 degrees of freedom (DOFs) in the absence of beams. It has three beams, which provide 3 constraints, and so this structure has 9−3=6 DOFs, which are precisely the 6 rigid body DOFs of this structure. Removal of any one beam makes it possible for two of the points to move relative to each other. Hence, this is a minimally rigid hinged structure.

Figure 5B:
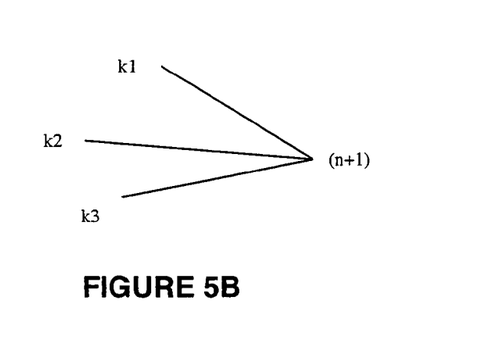
FIG. 5B shows the addition of a point to a minimally rigid hinged structure.

Let points k1, k2 and k3 be three non-co-linear points that are part of a minimally rigid hinged structure with n points and m beams, as shown in FIG. 5B (the entire structure is not shown, and the structure can be of any size). We add a point (n+1), not in the plane of points {k1, k2, k3}, to the structure by joining it to the three points using three hinged beams, as shown. Then the resulting (n+1) point hinged structure with (m+3) beams is minimally rigid.

As proof, the point (n+1) must be at the intersection of three spheres centered at the points k1, k2 and k3, with radii $L_{k1,(n+1)}$, $L_{k2,(n+1)}$, $L_{k3,(n+1)}$ respectively. There are only two such intersection points when the three points k1, k2 and k3 are not co-linear. These two points are mirror images of each other with respect to the plane containing the three points k1, k2 and k3, and are not in the neighborhood of each other. Therefore, the point (n+1) cannot move relative to the points k1, k2 and k3 (and hence relative to any other point of the structure which is rigid prior to adding the point (n+1)), without altering the lengths $L_{k1,(n+1)}$, $L_{k2,(n+1)}$ or $L_{k3,(n+1)}$. Therefore the new structure with (n+1) points is rigid. If we remove any one of the three new beams $L_{k1,(n+1)}$, $L_{k2,(n+1)}$ or $L_{k3,(n+1)}$, then the point (n+1) can move in a circle in a plane perpendicular to the line joining the two points to which the remaining two new beams are connected by hinges. Therefore, the new structure with (n+1) points and (m+3) beams is minimally rigid. We can also verify that 3(n+1)−6=(m+3), because 3n−6=m, thus satisfying the necessary condition for minimally rigid hinged structure.

If the three points k1, k2 and k3 were co-linear, then the new point (n+1) can move along a circle in a plane perpendicular to the line joining the three points, relative to the rest of the structure, and so the new structure would not be rigid. If the new point (n+1) is in the plane of the three points {k1, k2, k3}, then the new point (n+1) can move infinitesimally small distance in a direction normal to the plane, and so the new structure will not be strictly rigid, though almost rigid.

Figure 5C:
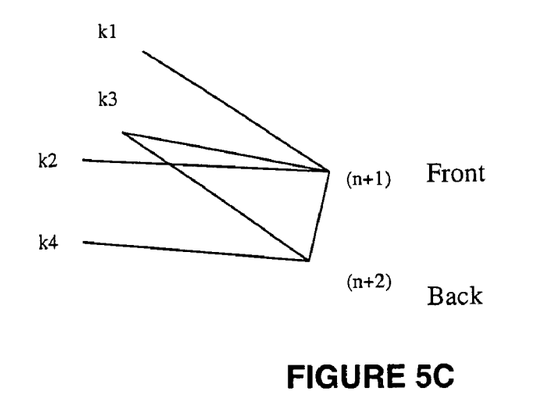
FIG. 5C shows the addition of a pair of points to a minimally rigid hinged structure.

Because we wish to develop a structure with a front (mirror) surface and a back surface, we wish to add pairs of points at a time, one to the front surface, and one to the back surface. As shown in FIG. 5C let points k1, k2, k3 and k4 be the four points that are part of a minimally rigid hinged structure with n points and m beams, and let (n+1) and (n+2) be the two new points (the entire structure is not shown, and the structure can be of any size), with each of the two triplets {k1,k2,k3} and {k3,k4,(n+1)} not co-linear, with point (n+1) not in the plane of {k1,k2,k3}, and point (n+2) not in the plane of {k3,k4,(n+1)}. We join the two points (n+1) and (n+2) to the four points {k1,k2,k3,k4} using six hinged beams, as shown. Then the resulting (n+2) point hinged structure with (m+6) beams is minimally rigid.

As proof, because {k1,k2,k3} are not co-linear and (n+1) is not in the plane of {k1,k2,k3}, the structure formed by adding the point (n+1) and the beams $L_{k1,(n+1)}$, $L_{k2,(n+1)}$, $L_{k3,(n+1)}$ is minimally rigid (see 4.2 above). Therefore, the three points {k3,k4,(n+1)} are part of a minimally rigid hinged structure. Because {k3,k4,(n+1)} are not collinear and point (n+2) is not in the plane of {k3,k4,(n+1)}, by using the result of 4.2 again, the resulting structure is minimally rigid. We also verify that 3(n+2)−6= (m+6), because 3n−6=m, thus satisfying the necessary condition for minimally rigid hinged structure.

The advantage of this construction step is that we can cover the front and back surfaces simultaneously as we go along, and as a consequence the sizes of all beams are comparable to the size of the basic triangle.

In order to be able to apply the above result repeatedly to cover all the points, we first need to define an initial small minimally rigid hinged structure to provide the starting point. Consider the hinged structure shown in FIG. 5D, with 6 points and 12 beams. (Verify that 3×6−6=12, satisfying the necessary condition).

Figure 5D:
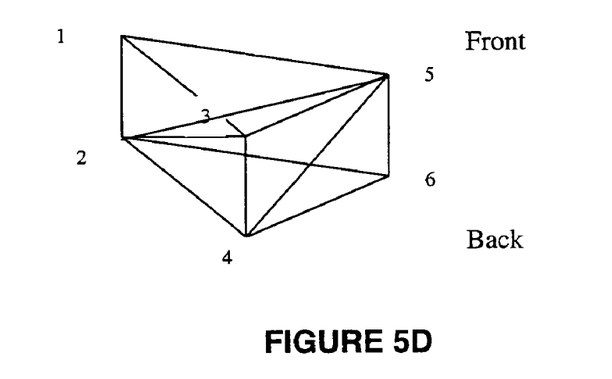
FIG. 5D illustrates fundamental minimally rigid hinged structure.

Points {1,3,5} are on the front surface, not co-linear, and points {2,4,6} are on the back surface. The hinged structure with points {1,3,5} and beams {$L_{1,3}$, $L_{3,5}$, $L_{5,1}$} is minimally rigid. Therefore, from section 4.2, the hinged structure with points {1,3,5,2} and beams {$L_{1,3}$, $L_{3,5}$, $L_{5,1}$, $L_{1,2}$, $L_{3,2}$, $L_{5,2}$} is minimally rigid. Since points {2,3,5} are part of a minimally rigid hinged structure, again using result from 4.2, the hinged structure with points {1,3,5,2,4} and beams {$L_{1,3}$, $L_{3,5}$, $L_{5,1}$, $L_{1,2}$, $L_{3,2}$, $L_{5,2}$, $L_{2,4}$, $L_{3,4}$, $L_{5,4}$} is minimally rigid. Since points {2,4,5} are part of a minimally rigid structure, again applying result of section 4.2, the structure shown is minimally rigid.

Figure 5E:
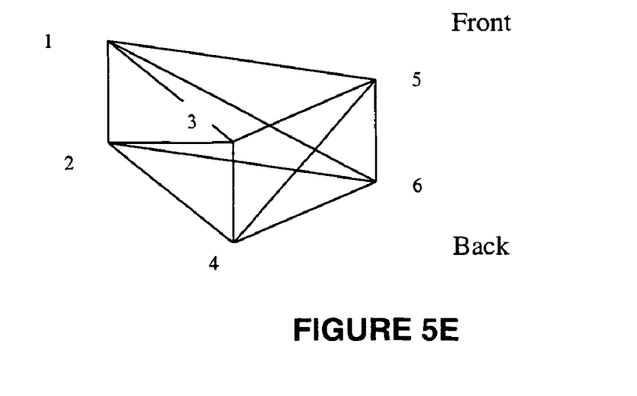
FIG. 5E illustrates a different fundamental minimally rigid hinged structure.

It turns out that the initial hinged structure shown in FIG. 5E is also minimally rigid. The only difference between this and the previous one is that the beam between points {2,5} has been replaced with the beam between points {1,6}. As a result, there is no point from which three beams proceed to the vertices of a triangle that has beams on its three sides. Therefore, the above proof will not work. The proof must rely on computing the rank of matrix H1 for this structure. It can be verified by writing a computer program.

Figure 5F:
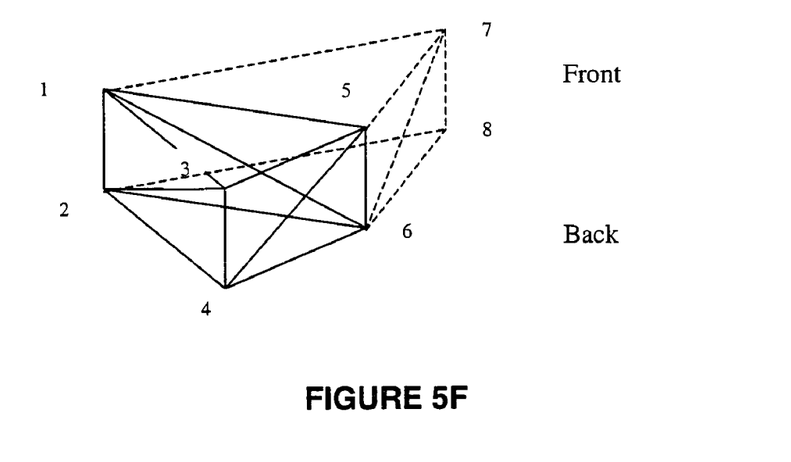
FIG. 5F illustrates adding a pair of points to the starting minimally rigid hinged structure.

Starting with either initial structure (or any other minimally rigid hinged structure with corresponding front and backside points) we can add the next pair of points {7,8} as shown in FIG. 5F, using the construction step developed in section 4.3.

Note that the crossbeam between points {6,7} could be replaced with a crossbeam between points {5,8} or one between {1,8} or one between {2,7}. Also, we could start with the initial structure (which itself is not unique) in a different part of the mirror. Also, at any stage of the construction, we could proceed in any one of several directions. These considerations show that the minimally rigid hinged structure for a given set of points is not unique.

The first of the two examples of minimally rigid hinged mirror substrate structures described above were generated by writing a computer program to automatically select the next step in the construction process. The second example (with a large gap) was generated deliberately by defining the steps in a particular (manually selected) sequence.

The deformation of the face sheet results in stresses in the face sheet itself, and these stresses can be minimized, but not eliminated, because the face sheet has a non zero modulus of elasticity. When the face sheet thickness is extremely small, as in the case of nano-laminates and membranes, which have thickness of the order of just a few tens of microns, the bending stiffness, which varies as the cube of thickness, becomes vanishingly small. While this very small bending stiffness seems attractive, there is a difficulty associated with extremely flexible face sheets. This is due to the hoop stress that develops when the face sheet deformation involves a change in the radius of curvature in two dimensions such as due to focus deformation, when the length of a closed loop circumferential path on the surface of the mirror changes. Even when the 2D radius of curvature is local, and this is common in many deformation profiles, the hoop stresses are there, locally.

When the hoop stress is compressive, the face sheet must accommodate this hoop stress without buckling (wrinkling). If the face sheet is too thin, such wrinkling can take place, or the face sheet may delaminate or debond. To prevent this from happening, either the face sheet must have sufficient thickness, or the face sheet must be biased in tension so that compressive stresses are avoided. From this viewpoint, it is preferable to have a low modulus of elasticity for the face sheet consistent with the need to maintain its shape.

An advantage of the hinged substrate is that the beams can be commanded to move the points on the front surface is any manner, including tangential directions. Keeping the radius of curvature the same, the structure can be commanded to expand the mirror surface tangentially, thereby increasing the hoop lengths, causing tensile hoop stress. Thus, if a decrease in radius of curvature is required, then by commanding also an increase in the tangential size along with the decrease in radius of curvature, the resulting compressive hoop stresses can be minimized, or replaced with tensile stresses.

Thus it seems inevitable that in general some stresses will exist in the face sheet, though reduced by proper design. These stresses will cause some reaction forces in the substrate structure. The stresses induced in the substrate are thus driven by the face sheet, and not by the substrate, and can be made as small as the face sheet permits.

Figure 7:
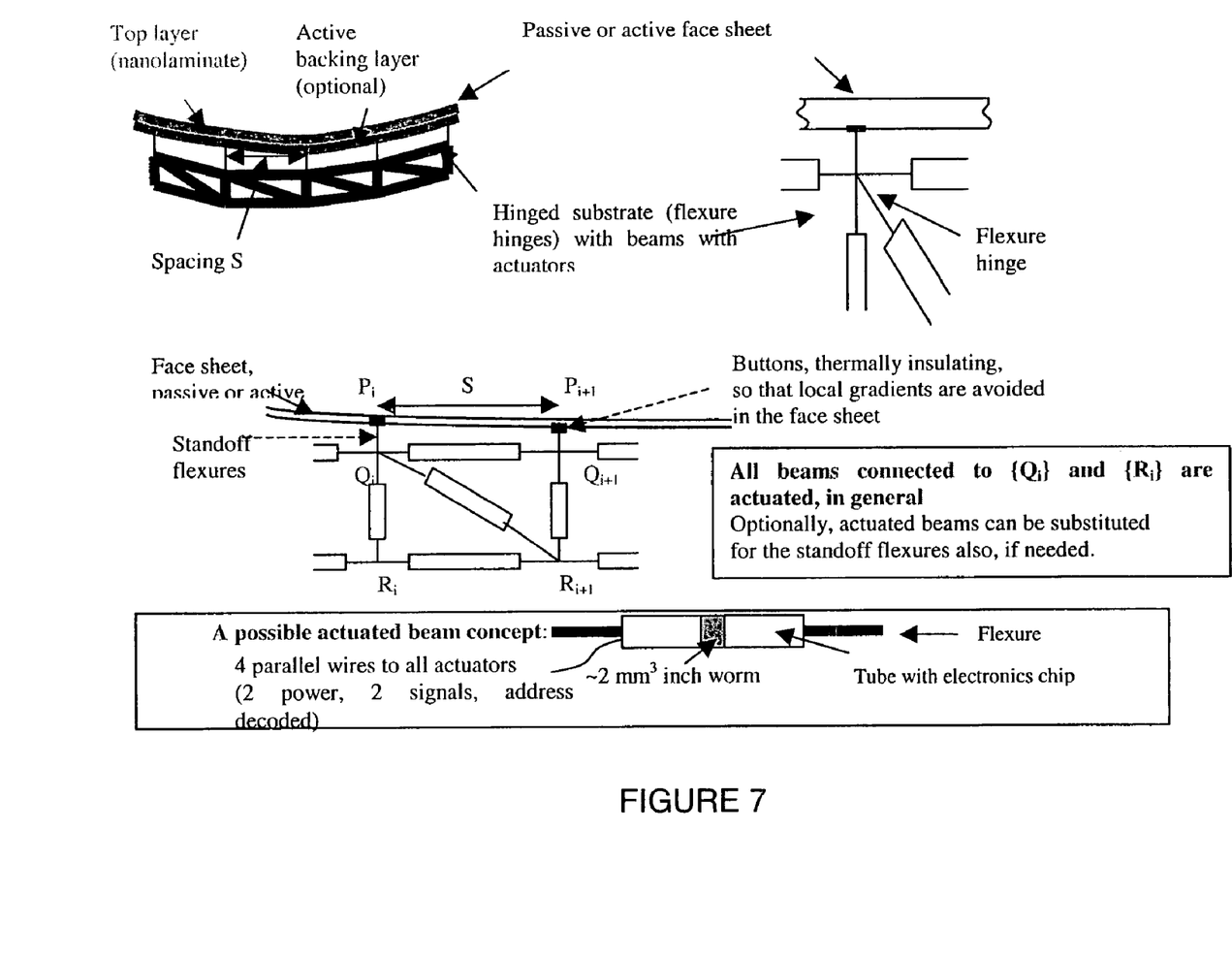
FIG. 7 illustrates how an ultra lightweight actuator could be used to implement the present invention.

By accommodating the tangential deformation of the face sheet (which may be caused as a result of bulk temperature changes) by the tangential actuation of the substrate, and accommodating the resulting focus shift by de-spacing the secondary mirror of the telescope, the net resulting corrective deformation of the face sheet has component mostly in a direction normal to the face sheet. This greatly minimizes the hoop stresses involved. If the hoop stresses in the deformation are still significant, then, optionally, in an optional embodiment of the invention, a method to support hoop stresses is shown in FIG. 7. An optional active layer, with distributed actuation using materials such as PVDF, is bonded to the backside of the face sheet, and so the tangential force exerted by the active layer can support the hoop stresses. The disadvantage of using the active layer is that it will have to match the tangential changes of the face sheet also, as otherwise it will introduce back the CTE mismatch problem. For this reason, this is included as an option, for completeness. In a given application of the invention, a trade study will be made to weight the pros (supporting hoop stresses, and minimizing quilting) and cons (CTE matching deformations) of the optional active layer, before using it.

FIG. 7 also shows how an ultra lightweight actuator, a MEMS actuator developed by Jet Propulsion Labs (JPL) could be used to implement this invention. The MEMS actuator is an example only, and this MEMS actuator itself is proprietary to JPL. The drive concept of using a bus structure to address all actuators using just a four-wire bus (2 wires for power, and 2 wires for command and data) is part of this invention.

Figure 6:
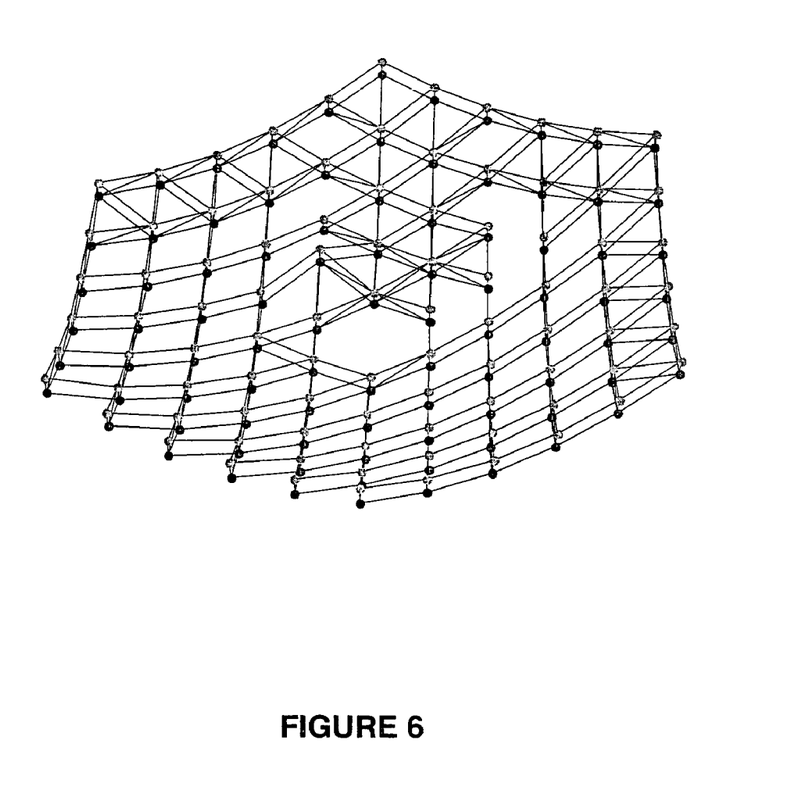
FIG. 6 shows a sample response to a single actuator command.

From equation (8), we can compute the deformation dxyz when a single actuator is actuated, by zeroing all elements except the selected beam in the vector cmd. For the first example of a minimally rigid hinged structure shown in FIG. 4A, a sample of single actuator response is shown in FIG. 6. The deformation in the z direction (normal to surface) is exaggerated so that the deformation can be seen clearly. Here a single cross beam was actuated. Notice how the back surface point is also moved up along with the front surface point. This illustrates the unique property of this hinged structure, that unlike the conventional surface normal actuator deformable mirror, the back surface also participates in the motion, and unlike the surface parallel deformable mirror with monolithic substrate the stresses in the substrate due to the deformation of the substrate itself are zero.

When a given deformation of the front surface is to be commanded, if we define the same deformation for the rear surface also, the resulting actuator commands computed from equation (7) will have zero values for all the normal beams. The surface parallel beams, when actuated appropriately, allow this structure to accommodate circumferential changes due to radius of curvature changes, and so can zero out the hoop stresses in the substrate structure. However, since the mirror face sheet is on top of this structure, it will encounter hoop stresses, unless it is very elastic, and will transmit them to the substrate.

An Alternate Method of Constructing the Minimally Rigid Hinged Substrate

In the methods described above, both front and back surface points are defined initially, then the beams are defined connecting the points in such a manner as to ensure the property of minimal rigidity. The arrangement of beams resulting from this method sometimes has gaps, which do not cause any problem in terms of the property of rigidity, but may lower the structural modal frequencies.

Figure 8A:
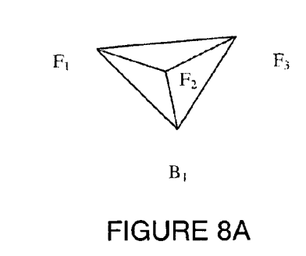
FIG. 8A illustrates an alternative method according to the invention wherein, starting with three front side points, one backside point is defined, forming a tetrahedron with six beams.

To remedy this situation, an alternate approach may be used which produces beam arrangements without such gaps. An illustrative example is given as follows:

Step 1: The front surface points are defined. (Note that in this case the backside points are not defined at the beginning);

Step 2: Starting with three front side points, one backside point is defined, forming a tetrahedron with six beams (which is minimally rigid), as shown in FIG. 8A.

Figure 8B:
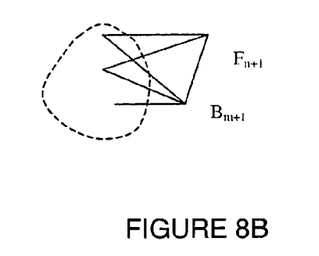
FIG. 8B continues the process begun in FIG. 8A, wherein one adjacent front side point is connected, adding one backside point and six connecting beams, resulting in a structure which is minimally rigid.
Figure 9:
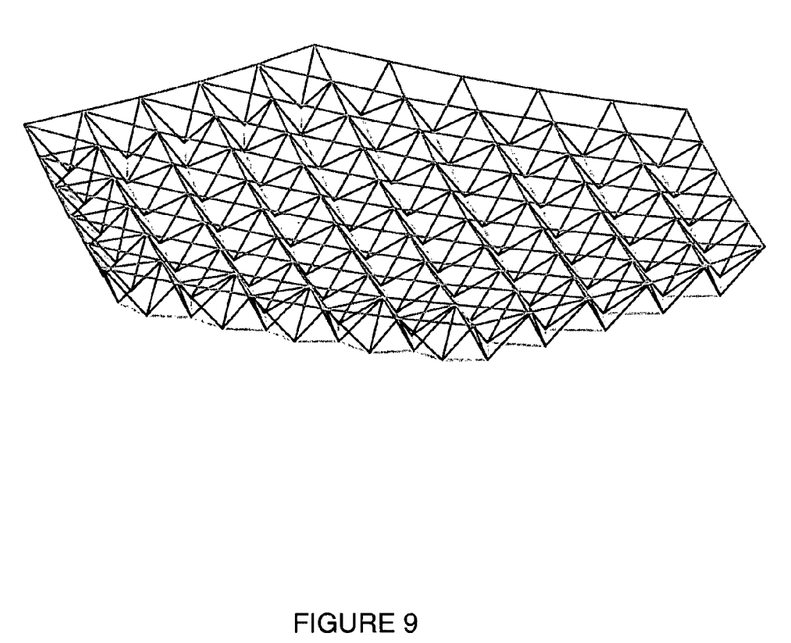
FIG. 9 is a 3-D view of a minimally rigid structure built using the method of FIGS. 8A and 8B.
Figure 10:
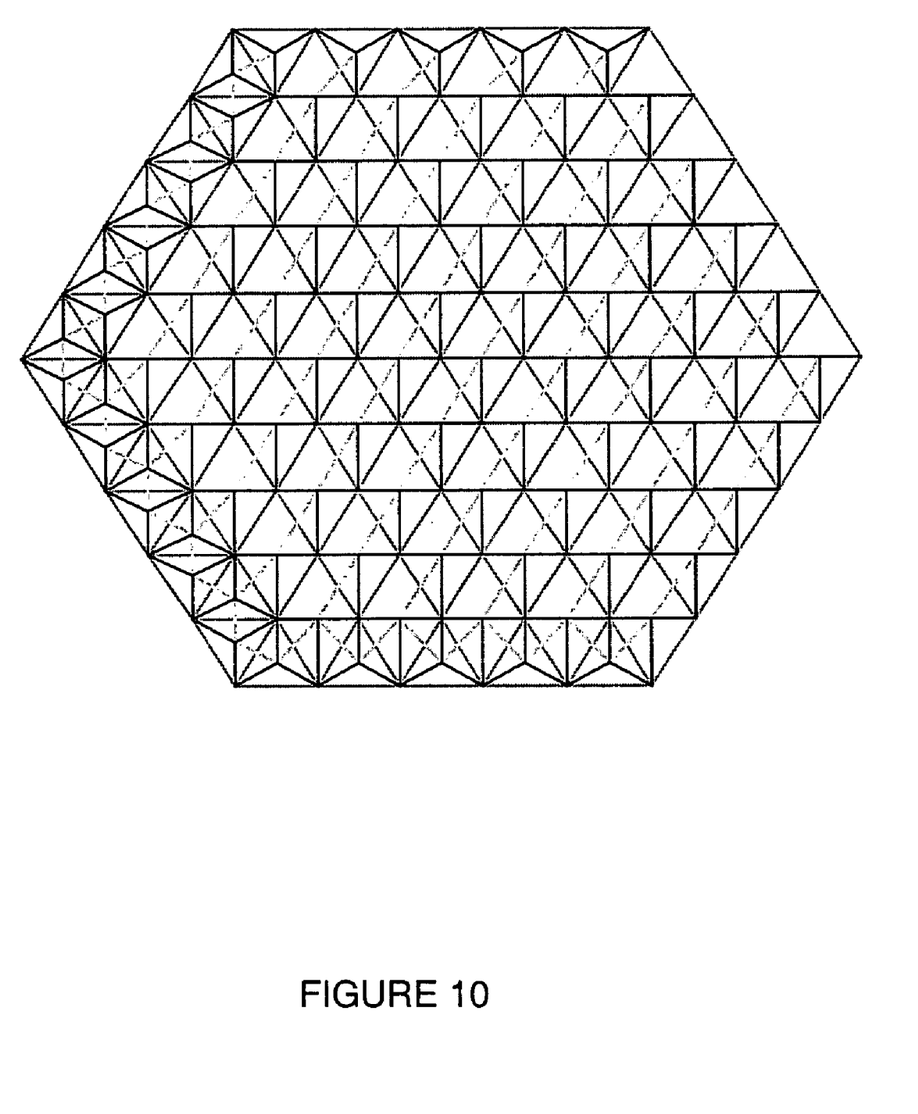
FIG. 10 is a 2-D view of a minimally rigid structure built using the method of FIGS. 8A and 8B.

Step 3: Then one adjacent front side point is connected, adding one backside point and six connecting beams, as shown in FIG. 8B, and the resulting structure is minimally rigid. Repeating step 3 appropriately, following a specific sequence, all front side points are covered, resulting structure being minimally rigid. FIG. 9 is a 3-D of such a structure, whereas FIG. 10 is a 2-D plot. In this example:

Number of points on front surface=91
Number of points on back surface=89
Total number of points=180
Number of beams on front side=179
Number of beams on back side=88
Number of beams back-to-front=267
Total number of beams=534
Number of uncontrolled flexible dofs=0

What is claimed is:

1. A deformable mirror assembly, comprising:
   a substrate using a plurality of hinged beams to form a minimally rigid structure defining a two-dimensional surface;
   the minimally rigid structure being characterized in that:
   a) the structure is rigid, and
   b) the removal of any one of the hinged beams permits relative motion between some points of the structure;
   a face sheet physically coupled to the substrate; and
   further including an actuator operative to command one or more of the beams to deform the face sheet.

2. The deformable mirror assembly of claim 1, wherein the beams can be commanded to deform the face sheet in any manner, including tangential directions.

3. The deformable mirror assembly of claim 1, wherein the actuator is a piezoelectric, electrostrictive or magnetostrictive device.

4. The deformable mirror assembly of claim 1, wherein the structure is substantially ideal in the sense that the torque transmitted across any hinge is identically zero.

5. The deformable mirror assembly of claim 1, wherein the structure made up of planar triangles, triangular pyramids or a combination thereof.

6. The deformable mirror assembly of claim 1, wherein:
   the face sheet is curved; and
   the structure contains one of more gaps to avoid being over-constrained.

7. The deformable mirror assembly of claim 6, wherein the face sheet is a paraboloid.

8. The deformable mirror assembly of claim 1, wherein the face sheet is sufficiently thick or biased in tension to avoid compressive stresses.

9. The deformable mirror assembly of claim 1, wherein the face sheet has a modulus of elasticity which is sufficiently low to maintain its shape during deformation.

10. The deformable mirror assembly of claim 1, wherein the face sheet has a thickness of less than 0.10 mm.

11. The deformable mirror assembly of claim 1, wherein the face sheet is a nano-laminate.

12. The deformable mirror assembly of claim 1, wherein the face sheet is a membrane.

13. An optical mirror using the assembly of claim 1.

14. An RF reflector using the assembly of claim 1.

15. A method of deforming a mirror, comprising the steps of:
   providing the assembly of claim 1; and
   changing the length of one or more of the beams.

16. A deformable mirror, comprising:
   a substrate using a plurality of hinged beams to form a minimally rigid structure defining a two-dimensional surface based upon planar triangles, triangular pyramids or a combination thereof;
   the minimally rigid structure being characterized in that:
   a) the structure is rigid, and
   b) the removal of any one of the hinged beams permits relative motion between some points of the structure;
   a face sheet physically coupled to the substrate; and
   an actuator operative to command one or more of the beams to deform the face sheet.

17. The deformable mirror of claim 16, wherein the beams can be commanded to deform the face sheet in any manner, including tangential directions.

18. The deformable mirror of claim 16, wherein the actuator is a piezoelectric, electrostrictive or magnetostrictive device.

19. The deformable mirror of claim 16, wherein the structure is substantially ideal in the sense that the torque transmitted across any hinge is identically zero.

20. The deformable mirror of claim 16, wherein:
   the face sheet is curved; and
   the structure contains one of more gaps to avoid being over-constrained.

21. The deformable mirror of claim 20, wherein the face sheet is a paraboloid.

22. The deformable mirror of claim 16, wherein the face sheet is sufficiently thick or biased in tension to avoid compressive stresses.

23. The deformable mirror of claim 16, wherein the face sheet has a modulus of elasticity which is sufficiently low to maintain its shape during deformation.

24. The deformable mirror of claim 16, wherein the face sheet has a thickness of less than 0.10 mm.

25. The deformable mirror of claim 16, wherein the face sheet is a nano-laminate.

26. The deformable mirror of claim 16, wherein the face sheet is a membrane.

* * * * *